United States Patent
Holmes et al.

(10) Patent No.: US 10,787,241 B2
(45) Date of Patent: Sep. 29, 2020

(54) AIRCRAFT JOINT

(71) Applicant: AIRBUS OPERATIONS LIMITED, Bristol (GB)

(72) Inventors: Vernon Holmes, Bristol (GB); Rodney Evans, Bristol (GB); Stefanos Kosteletos, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 253 days.

(21) Appl. No.: 15/593,036

(22) Filed: May 11, 2017

(65) Prior Publication Data

US 2017/0327203 A1 Nov. 16, 2017

(30) Foreign Application Priority Data

May 11, 2016 (EP) .................................... 16386007

(51) Int. Cl.
*B64C 3/26* (2006.01)
*B64C 3/28* (2006.01)

(52) U.S. Cl.
CPC . *B64C 3/26* (2013.01); *B64C 3/28* (2013.01)

(58) Field of Classification Search
CPC .................................... B64C 3/26; B64C 3/28
See application file for complete search history.

(56) References Cited

U.S. PATENT DOCUMENTS

| | | | |
|---|---|---|---|
| 4,891,732 A | 1/1990 | Jones | |
| 5,014,934 A | 5/1991 | McClaflin | |
| 5,280,412 A | 1/1994 | Podell et al. | |
| 2011/0233338 A1* | 9/2011 | Stewart | B64C 3/28 244/131 |
| 2015/0285290 A1 | 10/2015 | Roehrl et al. | |
| 2016/0244143 A1* | 8/2016 | Foster | B64C 3/26 |

FOREIGN PATENT DOCUMENTS

| | | | | |
|---|---|---|---|---|
| DE | 102012223863 A1 | 6/2014 | | |
| EP | 0269458 A1 | 6/1988 | | |
| EP | 3078587 A1 * | 10/2016 | ............... | B64C 3/28 |

OTHER PUBLICATIONS

EP Communication in EP Appln No. 16386007.5, dated Sep. 16, 2016.

* cited by examiner

*Primary Examiner* — Jessica B Wong
(74) *Attorney, Agent, or Firm* — Nixon & Vanderhye P.C.

(57) ABSTRACT

An aircraft joint between overlapping first and second components includes a fastener assembly. The fastener assembly includes a threaded fastener and a boss having an outer diameter and a threaded internal bore. The boss is fixedly attached to the second component at the overlap region. The first component has a through hole having a diameter sized to receive the outer diameter of the boss. The boss is received in the through hole from a first side of the first component. The fastener extends through the through hole from a second side of the first component opposite the first side. The fastener is threadably received in the internal bore of the boss and reacts against the second side of the first component to fasten the first component to the second component.

15 Claims, 4 Drawing Sheets

Detail C

AIRCRAFT JOINT

RELATED APPLICATIONS

The present application claims priority from European Application No. 16386007.5, filed May 11, 2016, the disclosure of which is hereby incorporated by reference herein in its entirety.

FIELD OF THE INVENTION

The present invention relates to a joint between two components.

BACKGROUND OF THE INVENTION

Aircraft wings commonly comprise a wing box structure with spanwise extending front and rear spars, and ribs extending chordwise between the front and rear spars. Upper and lower wing covers extend between the spars to form the upper and lower boundaries of the wing box. Leading and trailing edge structures, forward and aft of the front and rear spars respectively, typically comprise ribs and panels. Trailing edge panels are commonly substantially planar, whereas leading edge panels are commonly curved.

The covers and panels are typically fastened to the ribs and spars. The leading and trailing edge panels may extend spanwise across multiple ribs. The panels are typically joined to the wing covers e.g. by fastening butt-straps across the interior side of the joint, or by providing a joggle at the edge of the wing cover adjacent the panel and fastening the panel to the wing cover at the joggle.

In recent years there have been significant research developments into aerofoils which achieve natural laminar flow. Natural laminar flow aerofoils achieve laminar flow over the upper aerodynamic surface for a greater percentage of the wing chord than does a traditional turbulent wing. Active boundary layer control (e.g. suction devices) may be used to promote laminar flow but natural laminar flow wings achieve this passively. Natural laminar flow wings are designed (mostly by control of camber and leading edge radius) to achieve favourable pressure gradients resulting in significant runs of laminar flow. Laminar flow is typically limited in chordwise extent by shocks or boundary layer flow separation.

Surface roughness of the outer aerodynamic surface, particularly at the upper surface leading edge, will significantly affect the ability to achieve laminar flow. A laminar flow transonic aircraft fixed wing upper surface preferably has a maximum step height below 50 microns over at least 30% of the aerofoil chord from the aerodynamic leading edge. The fastener heads and fastener holes conventionally used to attach leading edge panels to leading edge ribs and to the wing covers are unlikely to be able to satisfy this step condition.

Furthermore, aircraft wing leading edge panels are subjected to particularly harsh environmental conditions. Hail, rain, ice, dust, debris, insects, birds and lightning are examples of items that may strike the exposed wing leading edge. Over time or after a significant impact it may become necessary to replace the leading edge panel. Removal of very many fasteners joining the leading edge panel to the leading edge ribs and the wing cover, and installation of a new panel again with very many fasteners, is time consuming leading to costly downtime of the aircraft for maintenance. This problem may be exacerbated by a move to natural laminar flow aerofoils, as the tighter tolerance for surface smoothness may lead to more frequent leading edge panel replacements. Reducing the time for replacement of the leading edge panel is therefore desirable.

SUMMARY OF THE INVENTION

A first aspect of the invention provides an aircraft joint comprising a first component, a second component overlapping the first component at an overlap region, and a fastener assembly including a threaded fastener and a boss having an outer diameter and a threaded internal bore, wherein the boss is fixedly attached to the second component at the overlap region, the first component has a through hole having a diameter sized to receive the outer diameter of the boss, the boss is received in the through hole from a first side of the first component, and the fastener extends through the through hole from a second side of the first component opposite the first side, and the fastener is threadably received in the internal bore of the boss and reacts against the second side of the first component to fasten the first component to the second component.

The invention is advantageous in that the fastener assembly is fully concealed within the overlap region and does not extend through the second component. This improves the ability to retain laminar flow at the aircraft joint where this is desirable. Since the fastener does not extend through the second component ease of assembly and/or disassembly of the joint is facilitated.

The fastener assembly may further comprise a washer which bears against the second side of the first component. The washer may be a stepped washer with a turret that extends into the through hole in the first component.

The fastener may have a head which bears against the washer.

The fastener may be removable from the boss.

The boss may be attached to the second component by one or more of bonding, fastening or welding. For example, where the second component comprises composite material, e.g. carbon fibre reinforced polymer, the fastener retainer may be attached by bonding and/or fastening. The fastening preferably does not extend though the full thickness of the second component. Where the second component and the fastener retainer each comprise a metallic material then the second component and the fastener retainer may be attached by welding.

The boss may have an attachment flange and the boss may be attached to the second component by the attachment flange.

The aircraft joint may further comprise a plurality of the fastener assemblies.

The first component may have a 'joggle', A joggle comprises a proximal portion, a distal portion extending substantially parallel with the proximal portion, and a ramp or step 52 between the proximal and distal portions. The ramp may extend at an angle to the proximal and distal portions.

The fastener shank may extend into the distal portion of the first component.

The first component may have an outer aerodynamic surface, and the second component may have an outer aerodynamic surface. The fastener assembly may constrain movement of the first component relative to the second component in a direction normal to the outer aerodynamic surfaces of first and second components in the vicinity of the fastener. The fastener assembly may be fully concealed below the outer aerodynamic surfaces at the joint and have no parts exposed in the outer aerodynamic surfaces at the joint. This improves the ability to retain laminar flow at the joint where this is desirable.

The outer aerodynamic surfaces of the first and second components may be substantially flush across the joint.

The first and second components may be aircraft wing components. For example, the first and second components may be a wing cover and a wing panel. A wing cover (or skin) is a structural component of an aircraft wing box. By contrast a wing panel is a non-structural component, i.e. it does not carry the main wing loads and simply provides the aerodynamic shape of the wing. Wing panels are typically provided at the leading edge (forward of the wing front spar) and at the trailing edge (aft of the wing rear spar) of the wing.

Alternatively the first and second components may be an access panel and a surrounding structure or fairing. The access panel may be easily removed for access to services or the like behind the panel. The surrounding structure may be an aircraft fuselage, empennage, nose, etc. or a fairing, e.g. a belly fairing, wing root joint fairing, etc. The benefits of ease of assembly/disassembly of the joint may be enjoyed both in locations where maintenance of laminar flow over the outer aerodynamic surfaces at the joint is important and in locations where this is not important.

The first and second components may be a wing upper cover and a wing leading edge panel. The wing leading edge panel may extend in a spanwise direction between leading edge ribs and across intermediate leading edge ribs. An aft edge of the wing leading edge panel extending between the spanwise ends may be coupled to the wing cover by the plurality of the fastener assemblies.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
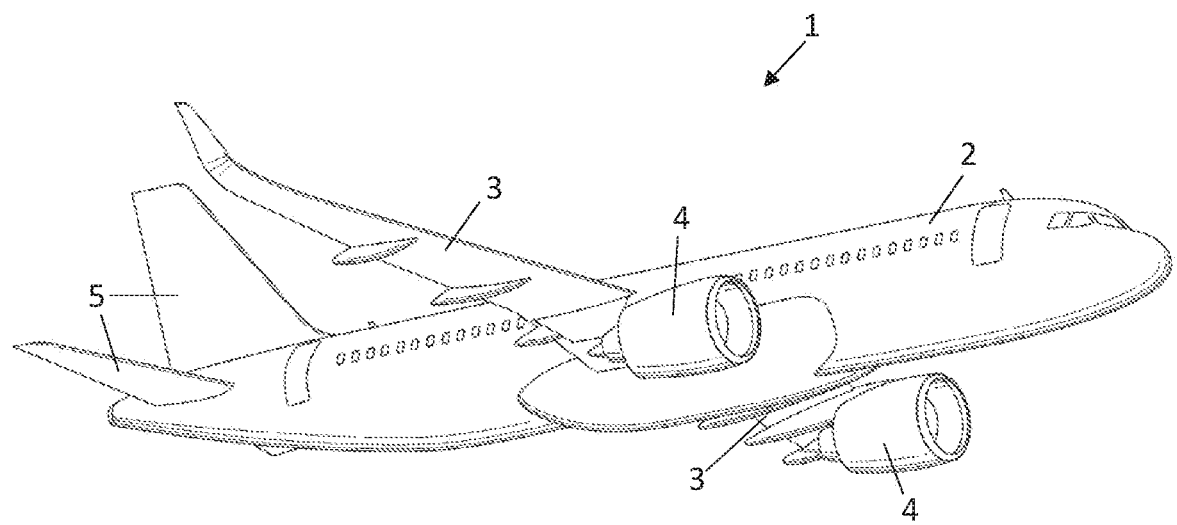
FIG. 1 illustrates a fixed wing aircraft.

FIG. 1 illustrates a typical configuration for a fixed wing passenger transonic jet transport aircraft 1. The aircraft 1 comprises a fuselage 2, wings 3, main engines 4 and horizontal and vertical tailplanes 5. It will be appreciated that this invention is applicable to a wide variety of aircraft types not just that illustrated in FIG. 1. For example, the aircraft, may be for commercial or military purposes, may be for transporting passengers or cargo, may have jet, propeller or other engine propulsion systems, may have a variety of fuselage/wing configurations, e.g. a high wing, low wing or blended wing body, and may be designed to fly at subsonic, transonic or supersonic speeds.

Figure 2:
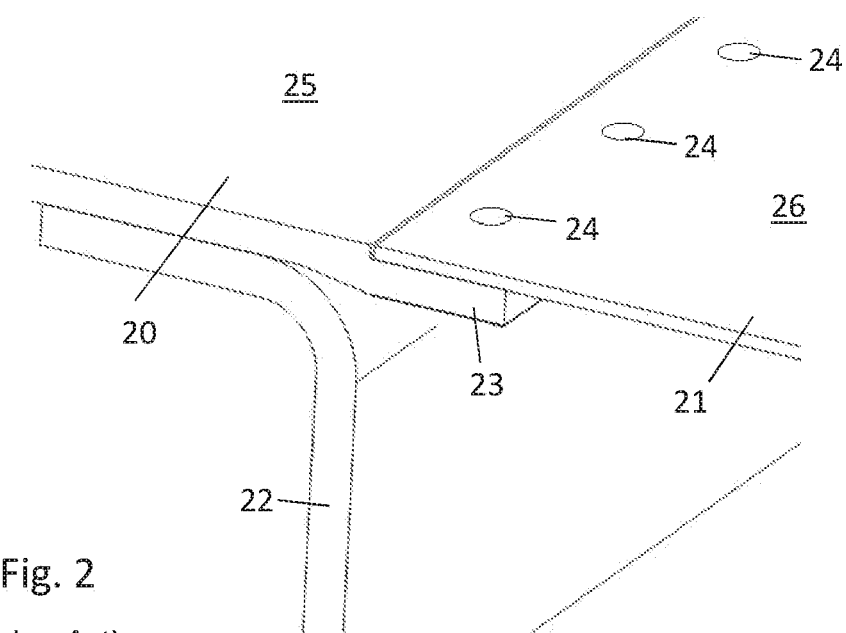
FIG. 2 illustrates schematically a known joint between an upper wing cover and a wing leading edge panel comprising a row of fasteners.

FIG. 2 illustrates a known joint between an upper wing cover 20 and a wing leading edge panel 21. The upper wing cover 20 is attached to a front spar 22. A forward edge of the upper wing cover 20 includes a joggle 23 and the wing leading edge panel 21 is fastened to the upper wing cover 20 by a plurality of fasteners 24. The outer surface 25 of the upper wing cover 20 and the outer surface 26 of the wing leading edge panel 21 are arranged substantially flush across the joint. The fasteners are countersunk but nevertheless the line of fasteners 24 provide exposed fastener heads which create a small but appreciable step in the upper surface of the wing adjacent the leading edge, which may have a detrimental effect on laminar flow.

Figure 3:
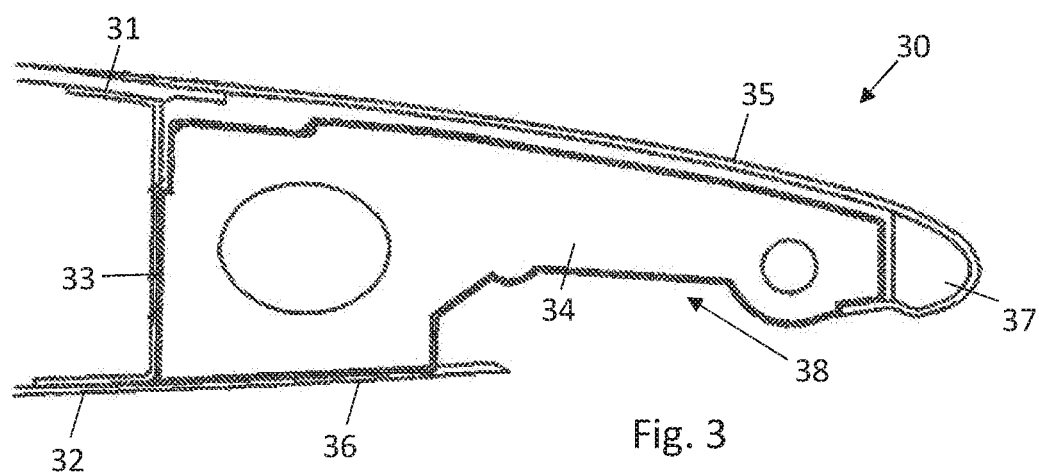
FIG. 3 illustrates a side view of a leading edge region of a laminar flow aerofoil for a fixed wing aircraft.

FIG. 3 illustrates a cutaway side view of the leading edge region of a laminar flow aerofoil for a fixed wing aircraft such as that shown in FIG. 1. The laminar flow wing 30 includes an upper wing cover 31, a lower wing cover 32, a front spar 33, a leading edge rib 34, an upper leading edge panel 35 and a lower leading edge panel 36.

The upper and lower wing covers 31, 32 are attached to the front spar 33. A plurality of the leading edge ribs 34 are provided spaced spanwise in front of the front spar 33 and are fixed thereto. The lower leading edge panel 36 extends spanwise across multiple leading edge ribs 34 and is attached to the ribs 34 and to the forward edge of the lower wing cover 32. The upper leading edge panel 35 also extends spanwise across a plurality of the leading edge ribs 34. The upper leading edge panel 35 extends forward of the upper wing cover 31 to the leading edge 37 of the wing 30 and curls under to attach to the underside of the rib 34 just aft of the wing leading edge 3'7. A cavity 38 is formed between the wing leading edge panels 37 and 36 which receives a Krueger flap high lift device (not shown). A joint 40 is used to attach upper leading edge panel 35 to the upper wing cover 31.

Figure 4:
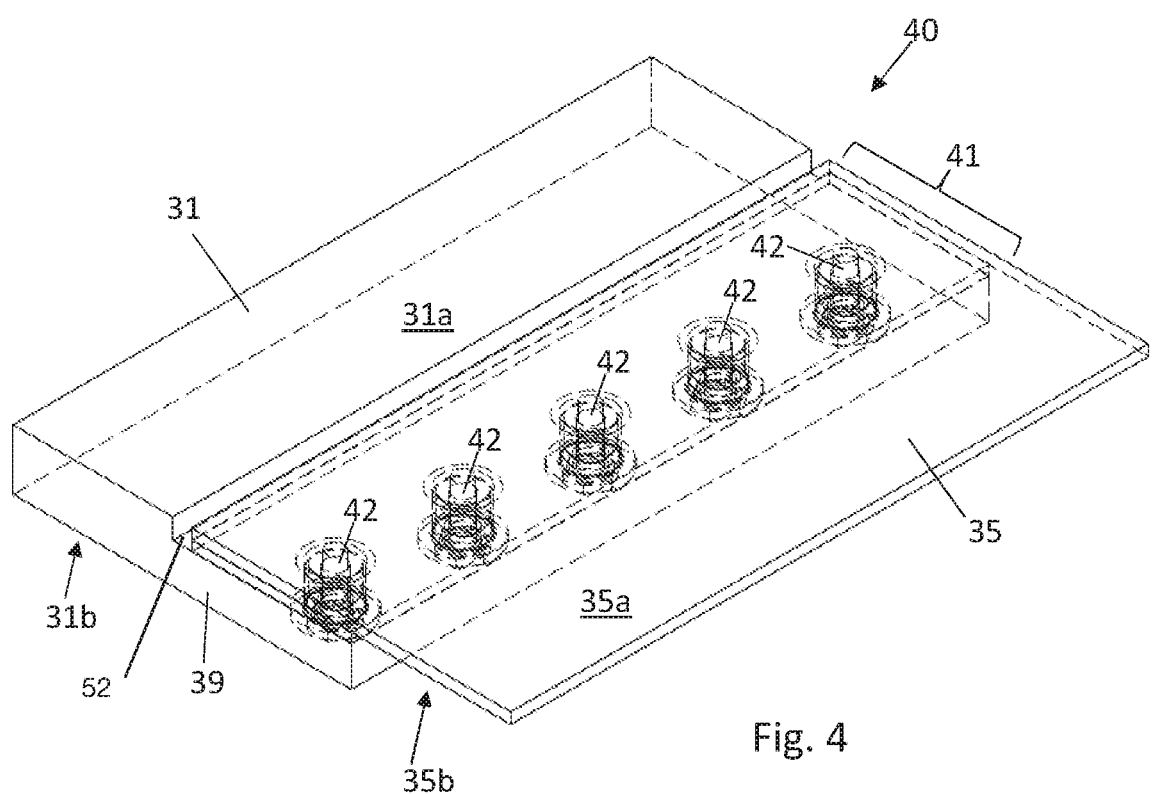
FIG. 4 illustrates a three dimensional view of a joint between a wing cover and a leading edge panel according to an embodiment of the invention.

FIG. 4 shows an isometric view of the joint 40 between the upper wing cover 31 and the upper wing leading edge panel 35. The upper wing cover 31 has an outer aerodynamic surface 31a and an inner surface 31b opposite the outer surface 31a. The upper wing leading edge panel 35 has an outer aerodynamic surface 35a and an inner surface 35b opposite the outer surface 35a. The forward edge of the upper wing cover 31 includes a joggle 39. The upper wing leading edge panel 35 overlaps the joggle 39 of the wing cover 31 to provide an overlap region 41 where the upper wing leading edge panel 35 overlaps the wing cover 31. A fastener assembly comprising a row of concealed fasteners 42 in the overlap region 41 joins the upper wing leading edge panel 35 to the upper wing cover 31.

Figure 5:
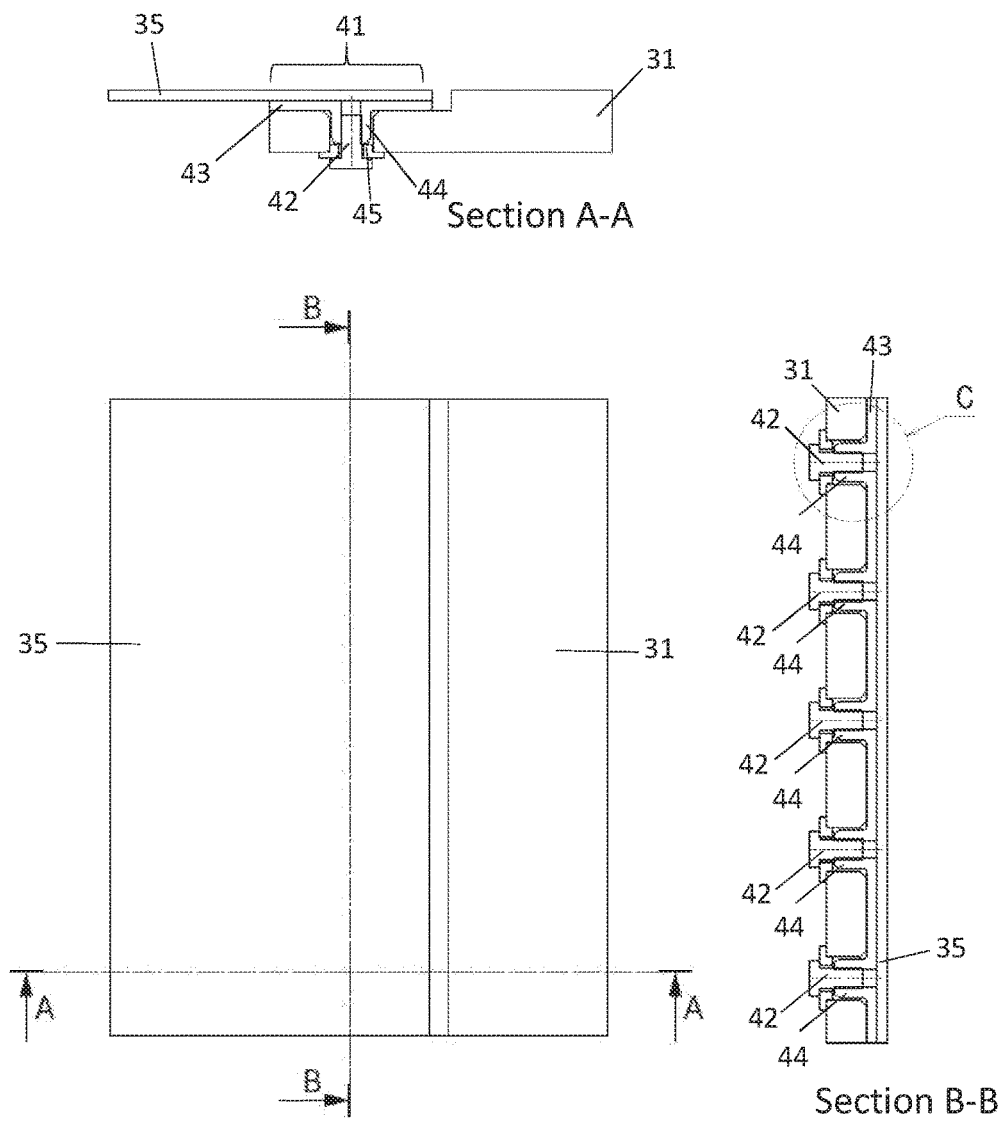
FIG. 5 illustrates plan and section views of the joint of FIG. 4.
Figure 5:
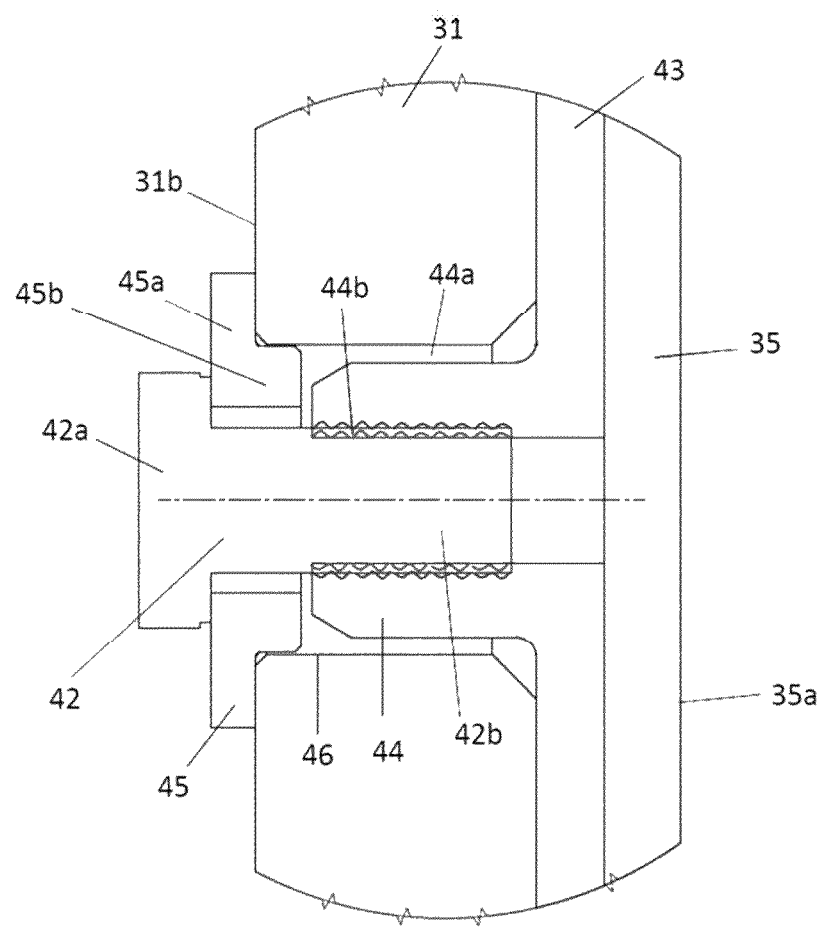

FIG. 5 shows plan and section views of the joint 40. The fastener assembly includes a threaded fastener 42 and a boss 44 having an outer diameter 44a and a threaded internal bore 44b. The boss 44 is integrally formed with an attachment flange 43 which is attached to the inner surface 35b of the upper wing leading edge panel. In the illustrated embodiment the attachment flange 43 is bonded to the surface 35b. The upper wing cover 31 has a through hole 46 having an inner diameter larger than the outer diameter 44a of the boss 44 so as to provide a clearance fit.

The attachment flange 43 is disposed between the inner surface 35b of the upper wing leading edge panel 35 and the outer surface 31a of the upper wing cover 31 at the joggle 39 and extends the full width of the overlapping region 41. The boss 44 projects from the attachment flange 43 into the through hole 46 in the upper wing cover 31. The height of the boss 44 is less than the thickness of the upper wing cover 31 at the location of the through hole 46.

The fastener 42 has a head 42a and a threaded shank 42b. The threaded shank 42b is threadably received in the threaded internal bore 44b of the boss 44. A stepped washer 45 is disposed between the fastener head 42a and the inner surface 31b of the upper wing cover 31. The stepped washer 45 has an annular flange portion 45a and a turret portion 45b which projects from the annular flange portion 45a. The annular flange portion 45a bears against the inner surface 31b of the upper wing cover 31. The turret portion 45b projects into the through hole 46 in the upper wing cover 31. The turret portion 45b has an outer diameter substantially corresponding to the inner diameter of the through hole 46. The annular flange portion 45a has an internal diameter greater than the outer diameter of the fastener shank 42b. The boss 44 has an outer diameter 44a less than the internal diameter of the through hole 46 to enable quick assembly and disassembly of the fastener assembly.

As best shown in the section view B-B of FIG. 5 the joint 40 comprises a plurality of fastener assemblies which in the illustrated embodiment includes a common attachment flange 43 for the plurality of bosses 44. However, in an alternative embodiment each boss 44 may have an attachment flange 43 separate from an adjacent boss attachment flange. The common attachment flange 43 however reduces parts count and reduces manufacturing and assembly time.

The joint 40 is assembled as follows. The common attachment flange 43 carrying the plurality of bosses 44 is bonded to the inner surface 35b of the upper wing leading edge panel 35. Any suitable aerospace grade adhesive or similar may be used for this purpose. Since the leading edge panel 35 is a "panel", i.e. it does not carry the main wing load and is provided simply to maintain the aerodynamic shape of the wing, bonding of the common attachment flange 43 to the panel 45 is sufficient.

It will be appreciated that in other embodiments the attachment flange 43 may be attached to the panel 35 by other attachment means including, for example, by fasteners or by welding. It is preferable that where fasteners are used, these do not have exposed fastener heads in the outer aerodynamic surface of the wing.

The upper wing leading edge panel 35 may comprise metal, such as aluminium, composite (such as carbon fibre reinforced polymer, for example) or may comprise a laminate construction including one or more metal plies and one or more composite plies. In the event that the inner surface 35h of the upper wing leading edge panel 35 is metallic and the attachment flange 43 is also made of metal then welding of the attachment flange 43 to the inner surface 35b of the upper leading panel 35 becomes possible. Where the inner surface 35b of the upper wing leading edge panel 35 is a composite, bonding and/or fastening will be appropriate.

The panel 35 having the common attachment flange 43 bonded thereto and carrying the plurality of bosses 44 is then offered up to the wing 30. With access from the side of the inner surfaces of the cover 31 and panel 35 the respective fasteners 42 with washers 45 are installed in the respective bosses 44. In the illustrated embodiment the fasteners 42 are standard bolts which are tightened in the bosses 44 such that the fastener head 42a bears against the washer 45 which in turn bears against the inner surface 31b of the upper wing cover 31 to clamp the upper wing leading edge panel 35 against the outer surface 31a of the joggle 39 of the upper wing cover 31.

Once each fastener 42 is tightened the fastener assemblies retain and constrain vertical movement of the leading edge panel 35 in the vertical direction i.e. normal to the outer surfaces 31a, 35a of the upper wing cover 31 and the upper wing leading edge panel 35 in the vicinity of the overlap region 41. The joint 40 therefore holds the wing leading edge panel 35 in contact with the joggled wing upper cover 31 and stops relative vertical movement between these components.

The outer aerodynamic surfaces of the upper wing cover 31 and the upper wing leading edge panel 35 are substantially flush across the joint 40. A small gap between the cover and the panel is filled with sealant (not shown) prior to use to create a contiguous aerodynamic surface across the joint. All parts of the fastener assembly sit inside the wing 30 within the wing leading edge region and therefore avoid any disturbance to the laminar flow around the outer surface of the wing 30.

Access to the fasteners 42 may be through the aperture 38 in the wing, which may require deployment of the Krueger high lift device. Alternatively, the access may be through an access panel in the leading edge lower surface.

To replace the leading edge panel 35, access is once again required to the fastener heads 42a. Once all fasteners 42 are removed from their respective bosses 44 the panel 35 can be removed from the wing 30. A replacement panel 35 having a replacement row of bosses 44 on a common attachment flange 43 is then offered up to the wing 30. The fasteners 42 or replacement fasteners are then (re)installed in the respective bosses 44 with respective washers 45.

The fastener assemblies allow for a reduction in the number of exposed fasteners used for joining the wing cover 31 to the leading edge panel 35. Reducing the number of fasteners has advantages twofold. Firstly, the number of exposed fastener heads in the outer aerodynamic surface is reduced. This is particularly beneficial in areas where the local flow is expected to be laminar as it enables laminar flow to be maintained for as far as possible in the downstream flow direction. Secondly, the fewer number of fasteners enables fastener installation and removal of the panel 35 from the wing 30. This improves manufacturing time for new aircraft and reduces maintenance downtime.

Inspection of the fastener assemblies may require deployment of the Krueger high lift device to open aperture 38 to allow access to the fastener assemblies visually or physically.

Although the invention has been described above with reference to one or more preferred embodiments, it will be appreciated that various changes or modifications may be made without departing from the scope of the invention as defined in the appended claims.

The invention claimed is:

1. An aircraft joint, comprising:
a first component,
a second component overlapping the first component at an overlap region,
and a fastener assembly including
a threaded fastener and
a circular cylindrical boss having an outer diameter and a threaded internal bore, wherein a center axis of the circular cylindrical boss is co-axial with a center axis of the internal bore,
wherein the circular cylindrical boss is fixedly attached to the second component at the overlap region, the first component has a circular through hole having a diameter sized to receive the outer diameter of the circular cylindrical boss, the circular cylindrical boss is received in the circular through hole from a first side of the first component, and the fastener extends through the circular through hole from a second side of the first component opposite the first side, and
the fastener is threadably received in the internal bore of the circular cylindrical boss and reacts against the second side of the first component to fasten the first component to the second component.

2. An aircraft joint according to claim 1, wherein the first component has an outer aerodynamic surface and the second component has an outer aerodynamic surface.

3. An aircraft joint according to claim 1, wherein the fastener assembly further comprises a washer which bears against the second side of the first component.

4. An aircraft joint according to claim 3, wherein the fastener has a head which bears against the washer.

5. An aircraft joint according to claim 1, wherein the fastener is removable from the boss.

6. An aircraft joint according to claim 1, wherein the boss is attached to the second component by one or more of bonding, fastening or welding.

7. An aircraft joint according to claim 6, wherein the boss has an attachment flange and the boss is attached to the second component by the attachment flange.

8. An aircraft joint according to claim 1, further comprising a plurality of the fastener assemblies.

9. An aircraft joint according to claim 1, wherein the first component has a joggle comprising a proximal portion, and a distal portion extending substantially parallel with the proximal portion.

10. An aircraft joint according to claim 9, wherein the fastener includes a shank extending into the distal portion of the first component.

11. An aircraft joint according claim 2, wherein the fastener assembly constrains movement of the first component relative to the second component in a direction normal to the outer aerodynamic surfaces of first and second components in the vicinity of the fastener assembly.

12. An aircraft joint according to claim 11, wherein the outer aerodynamic surfaces of the first and second components are substantially, flush across the joint.

13. An aircraft joint according to claim 1, wherein the first and second components are aircraft wing components.

14. An aircraft joint according to claim 13, wherein the first and second components are a wing cover and a wing leading edge panel.

15. An aircraft joint according to claim 1, wherein the first component and the second component are not overlapping outside the overlap region.

* * * * *